US010780425B2

(12) United States Patent
Jacobsen et al.

(10) Patent No.: US 10,780,425 B2
(45) Date of Patent: Sep. 22, 2020

(54) STEAM REFORMING CATALYST AND METHOD OF MAKING THEREOF

(71) Applicant: Haldor Topsoe A/S, Kgs. Lyngby (DK)

(72) Inventors: Joachim Harteg Jacobsen, Copenhagen (DK); Charlotte Vinding Ovesen, Virum (DK); Christian Daugaard, Vedbæk (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/704,216

(22) Filed: Sep. 14, 2017

(65) Prior Publication Data
US 2018/0001309 A1 Jan. 4, 2018

Related U.S. Application Data

(62) Division of application No. 14/428,268, filed as application No. PCT/EP2013/068784 on Sep. 11, 2013, now Pat. No. 9,789,470.

(30) Foreign Application Priority Data

Sep. 25, 2012 (WO) .................. PCT/EP2012/004001
Mar. 5, 2013 (WO) .................. PCT/EP2013/054440

(51) Int. Cl.
| | |
|---|---|
| *B01J 23/755* | (2006.01) |
| *B01J 35/10* | (2006.01) |
| *B01J 37/00* | (2006.01) |
| *C01B 3/40* | (2006.01) |
| *B01J 37/02* | (2006.01) |
| *B01J 35/00* | (2006.01) |
| *B01J 23/04* | (2006.01) |
| *B01J 37/08* | (2006.01) |
| *B01J 21/04* | (2006.01) |
| *B01J 23/00* | (2006.01) |
| *B01J 21/10* | (2006.01) |
| *B01J 23/78* | (2006.01) |
| *B01J 23/83* | (2006.01) |

(52) U.S. Cl.
CPC ............ *B01J 23/755* (2013.01); *B01J 21/04* (2013.01); *B01J 21/10* (2013.01); *B01J 23/005* (2013.01); *B01J 23/04* (2013.01); *B01J 23/78* (2013.01); *B01J 23/83* (2013.01); *B01J 35/002* (2013.01); *B01J 35/0006* (2013.01); *B01J 35/1004* (2013.01); *B01J 35/1014* (2013.01); *B01J 35/1033* (2013.01); *B01J 35/1038* (2013.01); *B01J 37/0009* (2013.01); *B01J 37/0063* (2013.01); *B01J 37/0201* (2013.01); *B01J 37/024* (2013.01); *B01J 37/0205* (2013.01); *B01J 37/0209* (2013.01); *B01J 37/08* (2013.01); *B01J 37/088* (2013.01); *C01B 3/40* (2013.01); *B01J 35/1019* (2013.01); *B01J 35/1023* (2013.01); *B01J 35/1028* (2013.01); *C01B 2203/0233* (2013.01); *C01B 2203/1058* (2013.01); *C01B 2203/1235* (2013.01); *C01B 2203/1241* (2013.01); *Y02P 20/52* (2015.11)

(58) Field of Classification Search
CPC ....................................................... B01J 23/755
See application file for complete search history.

(56) References Cited

U.S. PATENT DOCUMENTS

| | | | | |
|---|---|---|---|---|
| 2,454,227 | A * | 11/1948 | Beeck .................. | B01J 21/16 502/344 |
| 3,847,836 | A | 11/1974 | Nicklin et al. | |
| 4,579,729 | A * | 4/1986 | Schoenthal ............ | B82Y 30/00 423/626 |
| 2005/0250863 | A1* | 11/2005 | Green ................... | B01J 23/22 518/703 |
| 2006/0008413 | A1 | 1/2006 | Garg et al. | |
| 2006/0009352 | A1* | 1/2006 | Zhao .................... | B01J 23/58 502/302 |
| 2012/0070367 | A1 | 3/2012 | Bittencourt | |

FOREIGN PATENT DOCUMENTS

| | | |
|---|---|---|
| GB | 1003702 | 9/1965 |
| GB | 1166491 | 10/1969 |
| GB | 1509557 | 5/1989 |
| WO | WO 2012/121761 A1 | 9/2012 |

OTHER PUBLICATIONS

S. Komatsu et al., "Studies on the Catalytic Activity of Alkali Polyaluminate as a Catalyst and Support of Nickel Catalyst for Steam Reforming of Hydrocarbons", Bulletin of the Japan Petroleum Institute, vol. 16, No. 2, Nov. 1974, pp. 99-105.
M.S. Zefirov, "Active Aluminum Oxide", Chemical Encyclopedia vol. 1, Moscow 1995.

* cited by examiner

*Primary Examiner* — Douglas B Call
(74) *Attorney, Agent, or Firm* — Blank Rome LLP

(57) ABSTRACT

The invention provides a method for the production of a supported nickel catalyst, in which an aqueous mixture comprising an alkali metal salt plus other metal salts is sintered to form a support material. A supported nickel catalyst comprising potassium β-alumina is also provided.

10 Claims, 2 Drawing Sheets

STEAM REFORMING CATALYST AND METHOD OF MAKING THEREOF

This application is a divisional of application Ser. No. 14/428,268, filed Mar. 13, 2015, which is a 371 of International Application No. PCT/EP2013/068784, filed Sep. 11, 2013, which claims priority to International Application No. PCT/EP2012/004001, filed Sep. 25, 2012 and International Application No. PCT/EP2013/054440, filed Mar. 5, 2013.

FIELD OF THE INVENTION

The present invention relates to a steam reforming catalyst based on supported nickel, a method for making a supported nickel catalyst, and supported catalysts obtained via said method. The invention also provides the use of such catalysts in a steam reforming process.

BACKGROUND TO THE INVENTION

Steam reforming processes include pre-reforming, tubular reforming, heat exchange reforming, catalytic partial oxidation (CPO), auto-thermal reforming and secondary reforming. In the temperature range 400-1300° C. and in the presence of a metal-based catalyst (nickel), steam reacts with hydrocarbon feedstocks such as natural gas and naptha to yield syngas (carbon monoxide, carbon dioxide and hydrogen). Steam reforming catalysts usually comprise nickel on a refractory support material. The nickel is present as nickel oxide, which is reduced prior to use in the steam reformer.

"Coking" is a common phenomenon in steam reforming processes. It refers to formation of carbon, such as pyrolytic, encapsulating, or whisker coke, on metal surfaces. The ability to suppress the level of coking may be particularly advantageous for catalytic processes such as steam reforming. For example, coke formation may damage the mechanical structure of a catalyst in high-temperature applications (e.g. tubular reforming, heat exchange reforming), as well as reduce the steam reforming activity of the catalyst.

It is known that alkali metals (those in Group I of the periodic table) promote gasification of carbon, enhance adsorption of water and retards dissociation of methane and higher hydrocarbons on nickel catalysts in steam reforming processes.

In particular, alkali metals can increase the resistance of the catalyst to coking. For example, U.S. Pat. Nos. 7,378,389, 5,773,589, and Brazilian patent application no. PI 1000 656-7 describe the impregnation of support materials with alkali metal salts. Such processes require a two-step impregnation (impregnation with alkali metal salts and impregnation with metal salts), and the alkali metal is not an integral part of the support material.

Similarly, US 20012/0070367 also discloses a catalyst support containing Al, Mg with subsequent addition of potassium, thereby merely impregnating it onto the support and not becoming an integral part of it.

However, alkali metals have a tendency to migrate from the supported nickel catalyst. This can cause problems downstream from the steam reforming process, but also leads to loss of the useful properties of the alkali metal on the catalyst.

Other patent publications concerning steam reforming catalysts include WO 2012/031341, U.S. Pat. Nos. 7,767,619 and 6,984,371. In particular, publications where alkali is on the support yet not an integral part of it, include WO 2012/121761, US 2006/0008413, GB 1,003,702, U.S. Pat. No. 2,847,836, GB 1,166,491 and GB 1,509,557.

The need remains for a supported nickel catalyst in which coking is reduced for an extended period, i.e. one in which the migration of alkali metal from the catalyst is reduced.

SUMMARY OF THE INVENTION

In a first aspect, the invention provides a method for the production of a supported nickel catalyst precursor. The method comprises the steps of:
i. providing a mixture comprising:
  i. a magnesium mineral or magnesium salt,
  ii. optionally, a calcium mineral or calcium salt,
  iii. an aluminium mineral or aluminium salt,
  iv. an alkali metal salt, and
  v. optionally water;
ii. extruding said mixture and calcining the extrudate at a temperature from 300-600° C.
iii. sintering said calcined mixture at a temperature of between 1100-1400° C. to form a support material;
iv. impregnation of said support material with an aqueous solution comprising a nickel salt to provide a supported nickel catalyst precursor;
v. optionally repeating step iv.

The invention presents a method for making an alkali metal-promoted steam reforming nickel catalyst suitable for use in a steam reforming process. The invention improves alkali metal stability of the catalyst under reaction conditions through an alkali metal reservoir in the support thereby increasing the lifetime of the catalyst. As further explained below, the increased lifetime is directly related to higher catalyst activity and its capability of preventing undesired carbon formation.

This method comprises producing a supported nickel catalyst precursor via the method above, wherein, after each impregnation step iv. the supported nickel catalyst precursor is decomposed to form a supported nickel catalyst, suitably at temperatures between 350-500° C.

The invention further relates to a supported nickel catalyst and a supported metal catalyst precursor obtainable via the above methods.

Furthermore, a supported nickel catalyst is provided, comprising nickel supported on a support material, characterised in that said support material comprises potassium β-alumina or sodium β-alumina, or mixtures thereof.

As used herein the terms "potassium β-alumina or sodium β-alumina, or mixtures thereof" means that the support contains K-β-alumina phases or Na-β-alumina phases or mixtures of these wherein such phases may be stabilized or doped with another element such as Mg.

The invention also relates to the use of a supported nickel catalyst according to the invention as a catalyst in a steam reforming process.

A steam reforming process is also provided, comprising the steps of:
i. providing a supported nickel catalyst according to the invention;
ii. passing a hydrocarbon fuel over said supported nickel catalyst in the presence of steam so as to produce syngas.

DETAILED DESCRIPTION OF THE INVENTION

Figure 1:
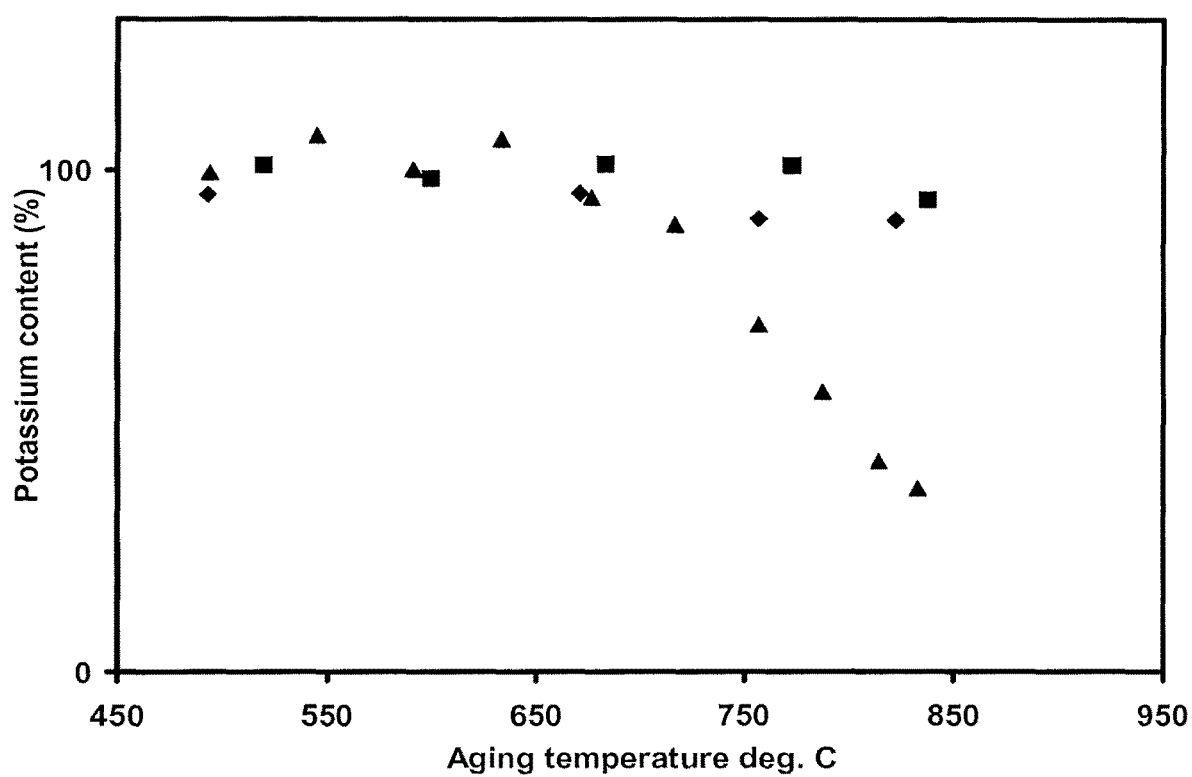
FIG. 1 shows the content of potassium of an aged catalyst relative to the content in a fresh catalyst. Squares and diamonds show potassium content in catalyst from catalysts according to the invention, while triangles are data from catalyst in comparative Example X.

In a first aspect, the invention provides a method for the production of a supported nickel catalyst precursor. The precursor is a stable intermediate in the production of a supported nickel catalyst, and can be readily converted into the supported nickel catalyst prior to use.

In its broadest aspect, the method comprises the steps of:
i. providing a mixture comprising:
  i. a magnesium mineral or magnesium salt,
  ii. optionally, a calcium mineral or calcium salt,
  iii. an aluminium mineral or aluminium salt,
  iv. an alkali metal salt, and
  v. optionally water;
ii. extruding said mixture and calcining the extrudate at a temperature from 300-600° C.
iii. sintering said calcined mixture at a temperature of between 1100-1400° C. to form a support material;
iv. impregnation of said support material with an aqueous solution comprising a nickel salt to provide a supported nickel catalyst precursor;
v. optionally repeating step iv.

As used herein the term "magnesium mineral" means a mineral which contains Mg, such as MgO or $MgAl_2O_4$, preferably MgO. The term "calcium mineral" means a mineral which contains Ca, such as CaO and $CaCO_3$, preferably $CaCO_3$; or a calcium aluminate such as $CaO.Al_2O_3$, $3CaO.Al_2O_3$, $CaO.6Al_2O_3$, $12CaO.7Al_2O_3$ and combinations thereof. The term "aluminium mineral" means a mineral which contains Al but no Mg or Ca, such as AlOOH, preferably in the form of boehmite or gibbsite.

In particular, the magnesium mineral may be MgO, $MgCO_3$, $MgAl_2O_4$ or $Mg_6Al_2(CO_3)(OH)16.4(H_2O)$ or the magnesium salt may be $Mg(OH)_2Mg(NO_3)_2$ or $Mg(C_2H_3O_2)_2$ of which MgO is the preferred magnesium precursor. This component suitably comprises between 1-12 wt % of the entire mixture.

A calcium mineral or calcium salt is optionally present in the mixture. Suitable calcium minerals include CaO and $Ca-CO_3$. Suitable calcium salts include $Ca(HCO_2)_2$, $Ca(OH)_2$ and $Ca(NO_3)_2$. Most preferred is $CaCO_3$. This component suitably comprises between 0-6 wt % of the entire mixture. The mixture also comprises aluminium mineral or aluminium salt. Suitable aluminium minerals include AlOOH, $Al(OH)_2$ and $Al_2O_3$. Suitable aluminium salts include $Al(NO_3)_3$. Most preferred are mixtures of AlOOH and $Al(OH)_3$.

These components suitably comprises in total between 30-50 wt % of the entire mixture.

The alkali metal salt is a salt selected from Group I of the periodic table, and is suitably a potassium or sodium salt, preferably a potassium salt. Suitable counterions include nitrate, hydroxide and carbonate. The nitrate salts are most preferred. This component suitably comprises between 0.5-2.5 wt % of the entire mixture.

The mixture in step i. may optionally comprise a mineral acid, preferably nitric acid.

Standard methods for providing the mixture are used, e.g. z-mixer, twin-screw mixer. The mixture should preferably be homogeneous. The mixture in step i may be in the form of an aqueous solution, an aqueous suspension, a gel or a paste, preferably a paste. The skilled person is able to select suitable mixing methods, depending on the viscosity and nature of the mixture.

The mixture is extruded, using any technique suitable for ceramic extrusion. The extrudate is calcined at a temperature from 300-600° C., preferably 400-500° C. Water is thus removed.

Preferably, the method comprises also milling the thus calcined mixture (calcined extrudates), mixing with a binder, particularly magnesium stearate, and tableting said extrudates.

The calcined mixture, preferably in the form of tablets obtained according to the above mentioned step, is then sintered at a temperature of between 1100-1400° C. to form a support material. Atomic diffusion occurs between the components of the mixture, binding the mixture together The sintering is preferably carried out at a temperature of between 1200-1400° C., more preferably 1250-1350° C.

The method may also comprise an embodiment in which said support material comprises 8 wt % or more potassium β-alumina. In another embodiment the support material may comprise 3 wt % or more, preferably 5 wt % or more potassium β-alumina, more preferably 3 to 7 wt %, as measured by XRD.

Analysis of the support material shows a pore volume of suitably at least 180 ml/kg. Furthermore, the support material preferably has a HBET surface area above 10 $m^2/g$.

The HBET surface area is determined by single point BET-analysis. The sample is placed in a U-tube and dried at 300° C. in a flow of helium for 8 hours. Hereafter the U-tube with the sample is cooled in a bath of liquid nitrogen and nitrogen is adsorbed on the sample by exposing the sample to a flow with 30% nitrogen in helium. The nitrogen concentration in the exit gas from the U-tube containing the sample is determined with a TCD (Thermal Conductivity Detector). When adsorption has come to an equilibrium the cooling bath is removed and a desorption peak is recorded and integrated. The BET surface area is obtained from the amount of nitrogen desorbed from the sample.

The pore volume is determined by Hg porosimetry. The sample is dried at 250° C. for 2 hours. The pore volume of the sample is determined by filling the pores with mercury. Pressure is ramped from ambient to 4140 bar and down again while pressure and volume data are collected. The data collected during pressurization are used for calculation of the pore size distribution. The finished support material suitably comprises 0.5-2.5 wt % potassium oxide, 70-80 wt % aluminium oxide, 0-8 wt % calcium oxide and 10-24 wt % magnesium oxide.

Phases present in the finished support material as determined by XRD analysis of the support material suitably comprise 8 wt % or more potassium β-alumina, 30-90 wt % magnesium alumina spinel, 0-60 wt % grossite and/or hibonite and 0-5 wt % α-alumina. The quantitative amount of phases present is determined through a Rietveld refinement analysis of the XRD difractogram using the commercial program HighScore Plus from PANalytical. The amount of potassium β-alumina given is the sum of the different potassium β-alumina phases present for instance $K_{1.62}Mg_{0.62}Al_{10.38}O_{17}$ and $K_2Mg_4Al_{30}O_{50}$.

Hence, the supports contain preferably K-β-alumina phases, for instance $K_{1.62}Mg_{0.62}Al_{10.38}O_{17}$, $K_2Mg_4Al_{30}O_{50}$ as determined by XRD analysis of XRD spectra (XRD powder diffractogram) where one or more of the distinct peaks at positions 2θ=7.83, 15.70, 5.50 and/or 11.10 are present, corresponding respectively to the distinct diffraction lines d=11.28 Å, d=5.64 Å, d=16.23 Å and/or d=8.03 Å.

In a preferred method according to the invention, the additional steps of milling the calcined extrudate, mixing with a binder, e.g. magnesium stearate or aluminium stearate or graphite, and tabletting said extrudate, are included between steps ii. and iii.

After formation of the support material, said support material is impregnated with an aqueous solution comprising a nickel salt to provide a supported nickel catalyst precursor. The nickel salt impregnates the pores of the support material.

Impregnation with nickel salt (i.e. step iv, above) may be repeated 2 or more times, to obtain the required amount of Ni, suitably 5-15 wt %. The nickel salt may be nickel nitrate, nickel citrate or nickel acetate. The nickel salt is preferably nickel nitrate. The aqueous solution has a concentration of Ni of at least 15 wt % Ni, preferably at least 20 wt % Ni.

The aqueous solution comprising a nickel salt may comprise one or more additional metal salts. Suitable additional metals include palladium, platinum, rhodium and copper. Alternatively, these additional metal salts may be impregnated in a separate step to the impregnation of aqueous solution of nickel salt.

The invention also provides a method for the production of a supported nickel catalyst from the supported nickel catalyst precursor. This method comprises the steps of: producing a supported nickel catalyst precursor via the method described herein, wherein, after each impregnation step iv. the supported nickel catalyst precursor is decomposed to form a supported nickel catalyst. Decomposition may take place in nitrogen, hydrogen or air, preferably in air at atmospheric pressure at temperatures between 350-500° C.

The invention allows the formation of a new supported nickel catalyst, in which an alkali metal promoter is embedded, i.e. integrated, within the support material, rather than being impregnated therein. This gives clear advantages in terms of the lifetime of the catalyst.

The supported nickel catalyst suitably comprises 5-20 wt % nickel monoxide.

Suitably, the supported nickel catalyst is not promoted with one or more compounds selected from titanium, zirconium, yttrium, niobium, or elements of the lanthanum series such as lanthanum, cerium, praseodymium, neodymium, promethium, samarium, europium, gadolinium, ytterbium. In other words, the only promoter in the supported nickel catalyst is an alkali metal salt.

The invention provides the supported nickel catalyst defined in a variety of ways. Firstly, the invention provides a supported nickel catalyst obtainable via the method set out above.

The invention also provides a supported nickel catalyst comprising nickel supported on a support material, characterised in that said support material comprises potassium β-alumina or sodium β-alumina, or mixtures thereof. In this respect, the support material may comprise 8 wt % or more potassium β-alumina, as measured by XRD. In another embodiment the support material may comprise 3 wt % or more, preferably 5 wt % or more potassium β-alumina, more preferably 3 to 7 wt %, as measured by XRD.

As mentioned above, the quantitative amount of phases present is determined through a Rietveld refinement analysis of the XRD difractogram using the commercial program HighScore Plus from PANalytical. The amount of potassium β-alumina given is the sum of the different potassium β-alumina phases present for instance $K_{1.62}Mg_{0.62}Al_{10.38}O_{17}$ and $K_2Mg_4Al_{30}O_{50}$. Hence, the support contains preferably K-β-alumina phases, for instance $K_{1.62}Mg_{0.62}Al_{10.38}O_{17}$, $K_2Mg_4Al_{30}O_{50}$ as determined by XRD analysis of XRD spectra (XRD powder diffractogram) where one or more of the distinct peaks at positions $2\theta=7.83$, 15.70, 5.50 and/or 11.10 are present, corresponding respectively to the distinct diffraction lines d=11.28 Å, d=5.64 Å, d=16.23 Å and/or d=8.03 Å.

The content of alkali metal affects the lifetime and activity of the catalyst. The more alkali metal, the longer the lifetime of the catalyst. However, alkali metal suppresses the steam reforming activity. The less alkali metal the higher the activity. Therefore there is a trade-off between the necessary lifetime of the catalyst and the necessary steam reforming activity which determines the most suitable range of alkali metal in the catalyst. Therefore the supported nickel catalyst suitably comprises 0.2-2 wt % potassium, preferably 0.5-1.5 wt % potassium, more preferably 0.7-1.1 wt % potassium. We have found that at these ranges not only are the catalysts more stable with extended lifetime, but exhibit also a higher reforming activity.

In particular, the extended lifetime of the catalysts of the present invention is directly related to their activity and ability to protect against carbon formation. The integration of the alkali within the support or carrier creates a reservoir of alkali which can replenish the alkali on the surface of the nickel crystallites as it diminishes over time. In conventional alkali-promoted catalysts the alkali is spattered over the surface of the support material and the nickel particles. While this prevents undesired carbon formation, a high number of the nickel active sites which otherwise should be available for reforming are covered by the alkali. This results in lower activity. In the present invention, an alkali reservoir is integrated within the support thereby leaving on the active surface only the required amount of alkali to prevent carbon formation and leaving more nickel sites available for reforming. A higher activity is obtained while still preventing carbon formation.

The supported nickel catalysts of the invention are useful in steam reforming processes. The invention thus provides the use of a supported nickel catalyst according to the invention as a catalyst in a steam reforming process. The invention also provides a steam reforming process comprising the steps of:
 i. providing a supported nickel catalyst according to the invention;
 ii. passing a hydrocarbon fuel over said supported nickel catalyst in the presence of steam so as to produce syngas.

The invention has been described with reference to a number of embodiments and examples, and the Figure. However, the invention is not restricted by these, and the skilled person is capable of adapting the invention within the scope of the enclosed claims.

EXAMPLES

Example I

Preparation of the Support:
Feed A: 1.1 g $KNO_3$
Feed B: Dry mixture of 72.7 g boehmite, 18.0 g gibbsite, 22.0 g MgO and 2.1 g $CaCO_3$ Feed A is added to a z-mixer containing 100 g of water and 5.2 g of $HNO_3$ (65 wt %) thermostated at 70° C. When feed A is dissolved, feed B is added and the mixture is mixed to homogeneity. The paste is then fed into an extruder. The extrudates are calcined at 450-500° C. The calcined extrudates are milled and mixed with magnesium stearate and tabletized. The tablets are sintered at 1200-1350° C.

Impregnation of the Support:
The support is impregnated by incipient wetness with a nickel nitrate solution. After impregnation the nickel nitrate is decomposed at 450° C.

Example II

Preparation of the Support:
Method and specifications as in example I but with the following specifications for feed A:
Feed A: 2.3 g $KNO_3$
Impregnation of the Support:
Procedure as in example I

Example III

Preparation of the Support:
Method and specifications as in example I but with the following feed specifications for feed A:
Feed A: 3.2 g $KNO_3$
Impregnation of the Support:
Procedure as in example I

Example IV

Preparation of the Support:
Method and specifications as in example I but with the following feed specifications for feed A and B:
Feed A: 2.3 g $KNO_3$
Feed B: Dry mixture of 77.0 g boehmite, 16.2 g gibbsite, 19.2 g MgO and 5.5 g $CaCO_3$
Impregnation of the Support:
Procedure as in example I

Example V

Preparation of the Support:
Method and specifications as in example I but with the following feed specifications for feed A and B:
Feed A: 3.3 g $KNO_3$
Feed B: Dry mixture of 77.0 g boehmite, 16.2 g gibbsite, 19.2 g MgO and 5.5 g $CaCO_3$
Impregnation of the Support:
Procedure as in example I

Example VI

Preparation of the Support:
Method and specifications as in example I but with the following feed specifications for feed A and B:
Feed A: 1.4 g $KNO_3$
Feed B: Dry mixture of 77.8 g boehmite, 16.6 g gibbsite, 18.0 g MgO and 7.7 g $CaCO_3$
Impregnation of the Support:
Procedure as in example I

Example VII

Preparation of the Support:
Method and specifications as in example I but with the following feed specifications for feed A and B:
Feed A: 3.5 g $KNO_3$
Feed B: Dry mixture of 77.8 g boehmite, 16.6 g gibbsite, 18.0 g MgO and 7.7 g $CaCO_3$ Impregnation of the Support:
Procedure as in example I

Example VIII

Preparation of the Support:
Method and specifications as in example I but with the following feed specifications for feed A and B:
Feed A: 3.8 g $KNO_3$
Feed B: Dry mixture of 80.4 g boehmite, 14.4 g gibbsite, 16.8 g MgO and 8.9 g $CaCO_3$
Impregnation of the Support:
Procedure as in example I

Example IX

Preparation of the Support:
Method and specifications as in example I but with the following feed specifications for feed A and B:
Feed A: 4.7 g $KNO_3$
Feed B: Dry mixture of 80.4 g boehmite, 14.4 g gibbsite, 16.8 g MgO and 8.9 g $CaCO_3$
Impregnation of the Support:
Procedure as in example I

Example X—Impregnation of Potassium

Preparation of the Support:
Method and specifications as in example I but with no addition of feed A and the following specifications for feed B:
Feed B: Dry mixture of 78.1 g boehmite, 16.4 g gibbsite, 18.0 g MgO and 7.6 g $CaCO_3$
Impregnation of the Support:
The support is impregnated by incipient wetness with a nickel nitrate and potassium nitrate solution where the ratio between nickel and potassium on mole basis is 24. After impregnation the catalyst is decomposed at 450° C.

The supports prepared according to method described in examples I-IX are characterized by containing K-β-alumina phases (for instance $K_{1.62}Mg_{0.62}Al_{10.38}O_{17}$, $K_2Mg_4Al_{30}O_{50}$) as determined by XRD analysis of XRD spectra (XRD powder diffractogram) where one or more of the distinct peaks at positions 2θ=7.83, 15.70, 5.50 and/or 11.10 are present, corresponding respectively to the distinct diffraction lines d=11.28 Å, d=5.64 Å, d=16.23 Å and/or d=8.03 Å.

Figure 2:
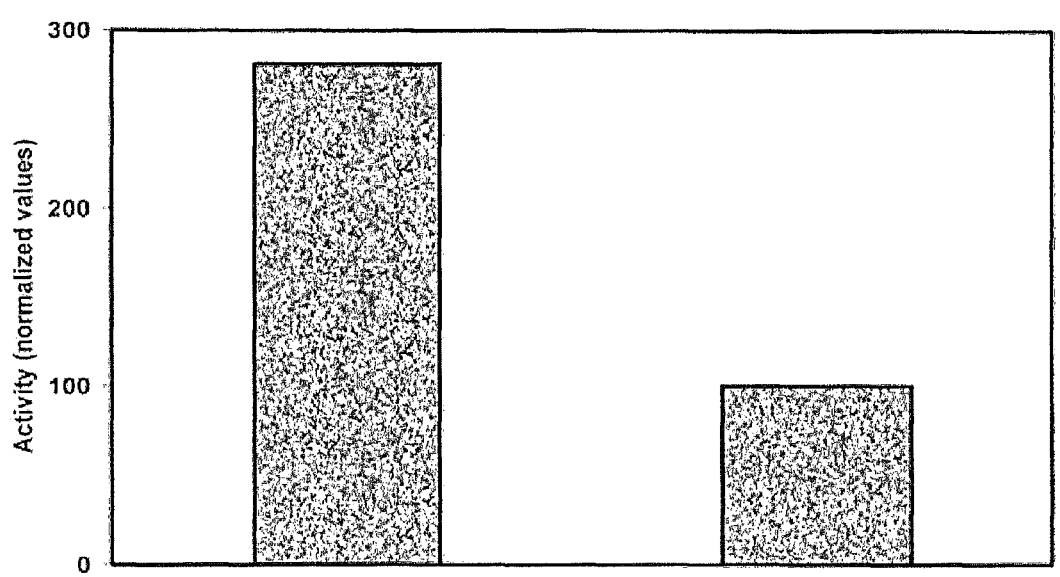
FIG. 2 shows the relative activity of catalysts according to Examples I-IX (left bar) and comparative Example X after ageing.

The stability of potassium is tested in a potassium loss experiment in which the reduced catalyst is aged in a plug flow reactor in a mixture of water, hydrogen and carbon dioxide at temperatures from 500 to 830° C. and a total pressure of 5 bar g for 31 hours. Loss of potassium is determined by measuring potassium content by chemical analysis in the catalyst before and after test. Improved potassium stability is observed for catalysts from Example I-IX produced according to the new method compared to catalyst produced according to Example X (see FIG. 1). In addition, FIG. 2 shows that the relative activities of the catalysts at aging temperature of 675° C. according to Example I-IX (left bar) are 2-3 times higher than the catalyst according to comparative Example X.

What is claimed is:
1. A supported nickel catalyst comprising nickel supported on a support material, wherein said support material comprises potassium β-alumina or sodium β-alumina, or mixtures thereof, wherein said support material comprises a pore volume of at least 180 ml/kg as determined by HG porosimetry, and wherein said support material comprises 8 wt % or more potassium β-alumina, as measured by XRD.

2. The supported nickel catalyst according to claim 1, wherein the supported nickel catalyst comprises 0.2-2 wt % potassium.

3. The supported nickel catalyst according to claim 1, wherein said support material comprises 0.5-2.5 wt % potassium oxide, 70-80 wt % aluminum oxide, 0-8 wt % calcium oxide, and 10-24 wt % magnesium oxide.

4. The supported nickel catalyst according to claim 3, wherein said support material comprises calcium oxide.

5. The supported nickel catalyst according to claim 1, wherein said support material comprises 8 wt % or more potassium β-alumina, 30-90 wt % magnesium alumina spinel, 0-60 wt % grossite and/or hibonite, and α-alumina, as measured by XRD.

6. The supported nickel catalyst according to claim 5, wherein said support material comprises at least one of grossite and hibonite.

7. The supported nickel catalyst according to claim 1, wherein the potassium β-alumina comprises $K_{1.62}Mg_{0.62}Al_{10.38}O_{17}$ or $K_2Mg_4Al_{30}O_{50}$ phases, as determined by XRD analysis.

8. The supported nickel catalyst according to claim 1, wherein said support material comprises sodium β-alumina as determined by XRD analysis.

9. The supported nickel catalyst according to claim 1, wherein said support material comprises a mixture of potassium β-alumina and sodium β-alumina.

10. Use of a supported nickel catalyst according to claim 1 as a catalyst in a steam reforming process.

\* \* \* \* \*